Figure 1:
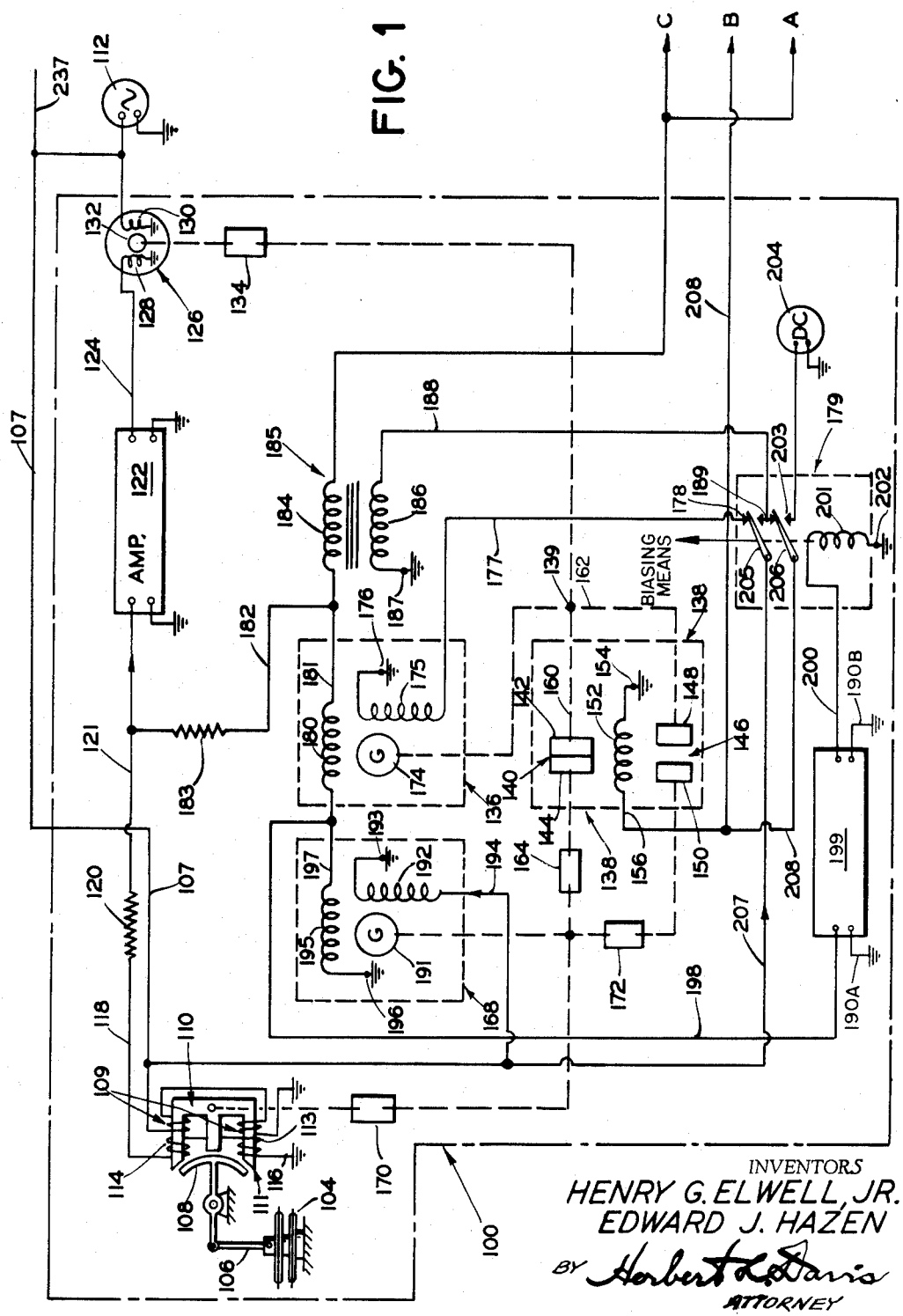

INVENTORS
HENRY G. ELWELL, JR.
EDWARD J. HAZEN
BY Herbert L. Davis
ATTORNEY

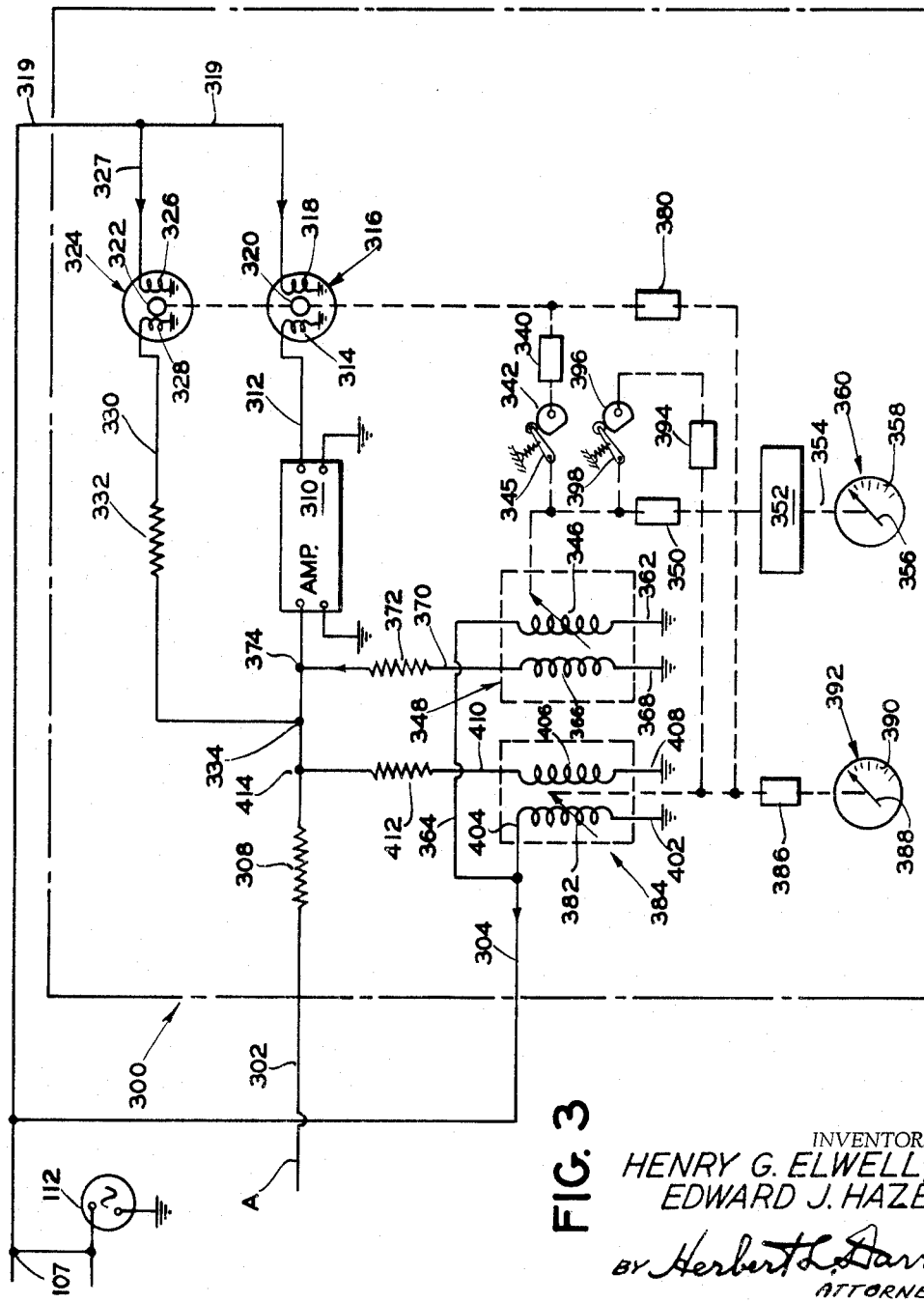

United States Patent Office 3,206,975
Patented Sept. 21, 1965

3,206,975
RATE OF ALTITUDE CHANGE SENSOR AND RATE OF CLIMB INDICATOR CONTROL SYSTEM
Henry G. Elwell, Jr., Westwood, and Edward J. Hazen, Woodcliff Lake, N.J., assignors to The Bendix Corporation, Teterboro, N.J., a corporation of Delaware
Filed Sept. 5, 1962, Ser. No. 221,604
14 Claims. (Cl. 73—179)

This invention relates to a novel rate of altitude change sensor and rate of climb indicator control system applicable to aircraft and operable over a large dynamic range of rate of altitude change and more particularly to a rate of altitude change sensor embodying means for instituting a voltage signal over a range of low rate of altitude change and means cooperating therewith for instituting a voltage signal over a range of high rate of altitude change and indicator means responsive to the voltage signals for instituting a control signal indicative of the sensed rate of altitude change which may be used to control suitable means for visually indicating the sensed rate of altitude change.

An object of the invention is to provide a control system including a rate of altitude change indicator adapted to be mounted on a craft having a pressure responsive member for sensing an altitude change, a linear inductive pickoff means for transducing the sensed altitude change into a control voltage which varies in accordance with the sensed altitude change, a reversible speed motor driven in a sense and at a rate of speed dependent upon the sign and amplitude respectively of the control voltage, first and second rate generators driven by the motor to provide a command voltage through their series connected output windings, and a system in which the command voltage is fed to the input of the motor to provide error rate motor control and a voltage which varies in sign with the sense of the altitude and magnitude in accordance with the rate of altitude change.

Another object of the invention is to provide in such a control system novel means for at least electrically disconnecting the first rate generator from the system upon attainment of a rate of altitude change of preferably 5,000 f.p.m. and substituting therefore a bias voltage of constant magnitude equal to the output voltage of the first generator at this rate of altitude change for rates of altitude change above 5,000 f.p.m. and in which system there are provided means to drive the pickoff to null to follow the sensed rate of altitude change.

Another object of the invention is to provide in such a control system a novel arrangement in which the motor is connected to the second rate generator through a high reduction gear train by the first clutch portion of a magnetically operated clutch mechanism over the range of altitude change from zero to 5,000 feet per minute, and through a low reduction gear train by a second clutch portion of the clutch mechanism over a range of altitude change from 5,000 f.p.m. to 125,000 f.p.m. while the second rate generator includes a drive shaft driven by the motor through one or the other of the gear trains and connected to drive the inductive pickoff to null to follow the sensed altitude change and an arrangement in which the control system by the provision of the new and novel clutch mechanism is able to maintain the command signal in conformance with the sensed rate of altitude change over the entire range of altitude change of the system.

Another object of the invention is to provide in such a control system a novel arrangement in which the command signal is used to drive a second reversible variable speed motor in a direction depending upon the sign of the command signal, the second motor drives a generator which is connected to the input of the motor to provide error rate damping of the motor and an arrangement in which the second motor drivingly positions the rotors of first and second transformers in accordance with the rate of altitude change.

Another object of the invention is to provide in such arrangement means to induce a voltage in the transformers which is in-phase opposition to the command signal and an arrangement in which the induced transformer voltage is supplied to the input of the second motor to provide error control therefor while the transformer rotors are connected to position indicator means in accordance with the rate of altitude change in a new and novel manner in accordance with this invention.

Another object of the invention is to provide in a control system of the aforenoted type means whereby the voltage induced in the first transformer accurately reflects the rate of altitude change up to 5,000 f.p.m. while the second transformer voltage output accurately reflects the rate of altitude change at least above a rate of altitude change of 5,000 f.p.m. up to 125,000 f.p.m.

Another object of the invention is to provide in a control system of the aforenoted type, means for rendering the variable output of the first transformer constant at a rate of altitude change of 5,000 f.p.m. and substituting therefor a bias voltage of constant magnitude equal to the output voltage of the first transformer over the range of altitude change above 5,000 f.p.m.

Figure 2:
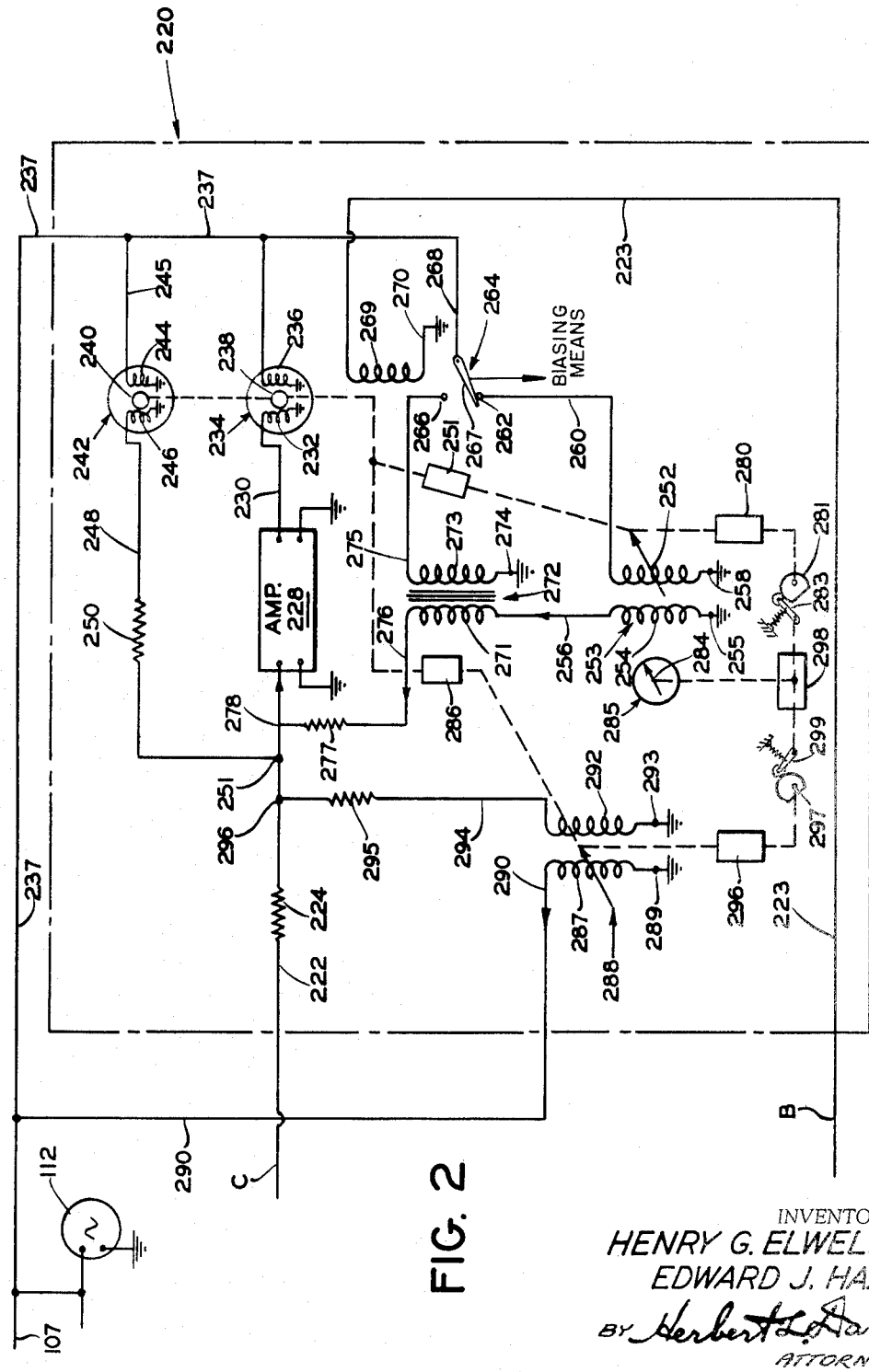

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for purposes of illustration and description only, and are not to be construed as defining the limits of the invention:

In the drawings:
FIGURE 1 is a schematic drawing of the improved rate of altitude change sensor of the invention;
FIGURE 2 is a schematic drawing of one form of the improved rate of altitude change indicator of the invention;
FIGURE 3 is a schematic drawing of another form of the improved rate of altitude change indicator of the invention.

Referring now to the drawing of FIGURE 1, there is shown a rate of altitude change sensor 100 adapted, in accordance with this invention, to institute a command voltage signal in accordance with a rate of altitude change over a large dynamic range from zero to 125,000 f.p.m. Sensor 100 is particularly adapted to operate in conjunction with the rate of altitude change indicator 220 of FIGURE 2 or the other form of the rate of altitude change indicator 300 of FIGURE 3 in accordance with this invention. Rate of altitude change indicators 220 and 300 are particularly adapted in accordance with this invention to actuate visual indicator pointer means in accordance with the rate of altitude change in response to a command voltage as will more clearly appear.

Turning now to the specific details of the improved rate of altitude change indicator system of this invention, the sensor 100 will be first described in detail:

*Sensor*

The sensor 100, FIGURE 1, is particularly adapted to be mounted on a craft capable of operating over a wide range of altitude change, comprises an altitude pressure responsive bellows member 104. The interior of bellows 104 is evacuated, and the exterior of the bellows is in communication with a source of static or atmospheric pressure. The bellows 104 is connected by linkage 106 to a ferrous vane or armature 108. Vane 108 is disposed adjacent the face of the E-type transformer 110 which may properly be called a pickoff having a primary winding 109 and a secondary winding 111. The winding 109 is connected by a conductor 107 to a suitable source of A.C. exciting voltage indicated by numeral 112.

The secondary winding 111 comprises a first winding 113 and a second winding 114 connected in phase opposition so that when the vane 108 is centered relative to the transformer 110 the voltages in windings 113 and 114 cancel and a null transformer output is obtained. Transformer winding 113 is connected to ground at 116 and winding 114 is connected to output through lead 118 having mixing resistor 120 interposed therein. Upon a change in altitude of the craft mounting the sensor the bellows 104 expands or contracts to move vane 108 across the face of transformer 110 to induce a positive or negative output voltage in transformer output lead 118 of a magnitude and sense depending on the direction and rate of altitude change as explained in U.S. Patent No. 2,726,544, granted December 13, 1955, to Harry G. Anastasia and Henry G. Elwell, Jr., and assigned to The Bendix Corporation.

Transformer output lead 118 is connected through resistor 120 and a lead 121 to the input of a high gain amplifier 122, which amplifier is connected by output lead 124 to a reversible two phase variable speed electric motor 126 having a control winding 128, exciting winding 130 and a rotor 132.

The output of the amplifier 122 is connected by lead 124 to motor control winding 128. Motor exciting winding 130 is connected to a suitable source 112 of alternating current exciting voltage. The motor rotor 132 is directly mechanically connected by gear train 134 to the rotor of a rate generator 136 of conventional type. The generator 136 may be formed integral with motor 126 in a manner well known in the art. The motor rotor 132 is also connected by gear train 134 to a clutch mechanism 138 at connecting point 139. The clutch mechanism 138 is provided with a first clutch portion 140 having normally engaged magnetically operated clutch elements 142 and 144; a second clutch portion 146 having normally disengaged magnetically operated clutch elements 148 and 150; and a magnetic operating means such as solenoid 152 which is connected to ground at 154 and to a source of D.C. exciting voltage by lead 156. At clutch connecting point 139 gear train 134 is directly connected by shaft 160 to clutch element 142 of clutch 140 and by shaft 162 to clutch element 148 of clutch 146. Clutch element 144 of clutch 140 is mechanically connected by high reduction gearing 164 to the rotor 191 of rate generator 168. Generator 168 is connected by gearing 170 to the E-type transformer pickoff 110 so that the pick-off 110 may be adjustably positioned in a sense tending to effect correspondance with armature 108 through a follow up driving connection in a manner well known to those skilled in the art. Clutch element 150 of clutch 146 is mechanically connected by low reduction gearing 172 to the rotor of generator 168.

The rate generator 136, as shown schematically in FIGURE 1, comprises a rotor 174 to which the motor rotor 132 is schematically shown to be connected by connecting means 134; an exciting winding 175 which is connected to ground at 176 and which is connected by lead 177 to switch contact 178 of double throw double pole switch 179; and an output winding 180 which is provided with an output lead 181. Output lead 181 connects to lead 182 having resistance 183 interposed therein, which lead connects to the input of amplifier 122. Lead 181 also has one end of a secondary winding 184 of a bias transformer 185 connected thereto and leading from an opposite end of the winding 184 are sensor output leads A and C. The primary winding 186 of the bias transformer 185 is connected to ground at 187 and by lead 188 to switch contact 189 of switch 179. The rate generator 168 comprises a rotor 191 to which gear trains 164 and 172 drivingly connect; an exciting winding 192 which is connected to ground at 193 and which is connected by lead 194 to a source 112 of A.C. exciting voltage; and an output winding 195 which is connected to ground at 196 and is series connected by interconnecting lead 197 to the output winding 180 of rate generator 136. A lead 198 connects interconnecting lead 197 to an input of a voltage sensitive gating device or discriminator 199 which may be of a conventional type having a grounded input 190A connected to the output winding 195 of the generator 168 through the grounded connection 196. The gating device or discriminator 199 is connected by lead 200 to an operating relay winding 201 of switch 179. Relay winding 201 is connected to ground at 202 and thereby to a grounded output 190B of the discriminator 199. Switch 179 is provided with a switch contact 203 connected to a source 204 of D.C. voltage, and a double switch having contact arms 205 and 206 in addition to the before-mentioned contacts 178, 189, and 203.

Contact arm 205 is connected by conductor 207 to the source 112 of alternating voltage. Contact arm 206 is connected by lead 208 to a sensor output conductor B and thereby to the indicator 220, later to be described. There is also connected from conductor 208 a lead 156 which is in turn connected to the operating means or solenoid 152 of clutch mechanism 138. Contact arms 205 and 206 are normally in contacting relation with switch contacts 178 and 189, respectively, while upon energization of the operating relay winding 201 the contact arms 205 and 206 are biased thereby in a clockwise direction so as to open the contacts 178 and 189 and close switch contacts 189 and 203, respectively.

The construction of sensor 100 having been described, the operation of the sensor will now be described.

*Sensor operation*

In considering the operation of the sensor 100, it will be first assumed that a slow rate of altitude change is being effected by changes in the altitude of the craft in which is mounted the sensor 100 so as to subject the sensor 100 to such changes within the ranges of, for example, from zero to 5,000 f.p.m. Under these conditions, the contact arms of switch 179 will be biased by suitable biasing means to the position shown in FIGURE 1 and the relay winding 201 of switch 179 will be de-energized. Contact arm 205 will therefore be in contact with switch contact 178 to connect the exciting winding 175 of generator 136 to the source 112 of A.C. exciting voltage. Also, bias transformer 185 is disconnected from the source 112 of A.C. exciting voltage and the magnetic operating means 152 for clutch mechanism 138 is disconnected from its source 204 of D.C. exciting voltage. Clutch elements 142 and 144 of clutch portion 140 are therefore engaged and clutch elements 148 and 150 of clutch portion 146 are disengaged. The exciting winding 192 of generator 168 is at all times connected to the source 112 of A.C. exciting voltage while the sensor is in operation.

In operation, a change in the altitude of the craft in which is mounted the sensing means of sensor 100 causes the bellows 104 to expand or contract in proportion and at a rate depending upon the rate of change in altitude being effected by the craft. The vane 108, which is connected to the bellows 104, therefore, moves from its centered position relative to E-type transformer 110 across the face of the transformer to induce a positive or negative signal, as the case may be, in the secondary windings 113 and 114 of the transformer 110. This induced voltage is proportional to the sensed rate of altitude change of the craft and is fed through leads 116 and 118 and mixing resistor 120 therein into amplifier 122.

The amplifier 122 amplifies this control voltage signal and impresses it upon the control winding 128 of motor 126. The motor rotor 132 therefore in response to a positive control voltage, for example, is caused to rotate in a forward direction at a rate of speed which is proportional to the magnitude of the positive control voltage, for example. Conversely, the motor rotor 132 in response to a negative control signal is caused to rotate in a reverse direction at a rate of speed which is proportional to the negative control voltage. The motor rotor 132 is mechanically connected to the rotor 174 of generator 136 to drive the generator rotor at a low rate of speed and to the clutch elements 142 and 148 of clutch portions 140 and 146, respectively, which form a part of clutch mechanism 138.

Clutch element 142 is normally engaged with clutch element 144 of clutch 140 and clutch element 148 is normally disengaged from clutch element 150 of clutch 146. Therefore, when a slow rate of altitude change is being effected, in the order of for example zero to 5,000 f.p.m., motor rotor 132 is normally operative to drive the rotor 191 of generator 168 through high reduction gearing 164 at a low rate of speed. The motor 126 in addition to driving the rotor 191 through gearing 164 also drives the E-type transformer pickoff 110 through gearing 170 at a rate of speed proportional to the rate of speed of the motor 126 to drive the pickoff 110 to null to control the rate of speed and rotational direction of motor 126.

It will be appreciated from the foregoing that in this mode of operation when a rate of change of altitude in the order of zero to 5,000 f.p.m. is being effected generators 136 and 168 are operably driven by motor 126 at a rate proportional to the rate of speed of motor 126 which is proportional to the rate of altitude change being effected by the craft mounting the sensor 100. Generator rotor 191 is thus connected to transformer 110 and so arranged that the motor 126 may drive the transformer 110 to null as the generator rotor 191 driven by the motor 126 is rotating at a speed which produces a voltage output indicating that the sensor output voltage signal is proportionally equal to the rate of change in altitude sensed by the pressure responsive member 104. Under such conditions the control voltage which controls motor 126 is maintained at a magnitude and sense to maintain the motor output speed proportionally equal to the sensed rate of altitude change to thereby maintain the sensor output voltage proportionally equal to the sensed rate of altitude change.

The sensor output through lead 181 is the sum of the voltage outputs of series connected generators 168 and 136. The generator 168 in addition to being connected to generator 136 by lead 197 is connected to the voltage gating device or discriminator 199 by lead 198. The voltage gating device or discriminator 199 is operative to effectively energize relay winding 201 of switch 179 in response to a predetermined voltage output of generator 168 when the sensor output voltage is proportionally equal to a predetermined rate of altitude change, 5,000 f.p.m., for example. Upon the effective energization of relay winding 201, switch contact arms 205 and 206 are pivoted downwardly to open contacts 178 and 189, respectively, and into contacting relation with switch contacts 189 and 203, respectively, so as to position switch arm 205 to disconnect the exciting winding 175 of the generator 136 from the source 112 of A.C. exciting voltage and to position the switch arm 205 so as to connect the primary winding 186 of bias transformer 185 through conductor 207 to the source 112 of A.C. exciting voltage; and to so position switch arm 206 as to connect magnetic clutch operating winding 152 to the source 204 of D.C. energizing voltage.

When thus energized, the clutch operating winding 152 magnetically disengages clutch element 142 from clutch element 144 of clutch 140 and magnetically engages clutch element 148 with clutch element 150 of clutch 146. The electric motor 126 is further drivingly connected by gear train 134 through clutch 146, and low reduction gear train 172 to the rotor 191 of generator 168. The rotor 174 of generator 136 remains connected to motor 126 but freely rotates producing no output voltage because its exciting winding 175 is disconnected from the source 112 of A.C. exciting voltage by the adjusted position of switch arm 205 upon energization of relay winding 201.

When the total sensor output voltage exceeds an amount indicative of a 5,000 f.p.m. rate of altitude change being effected by the craft in the illustrated embodiment of the invention, the generator 136 is electrically disconnected from the sensor circuit because its output voltage above its cut-off point, which is a predetermined proportional amount of the total sensor output, becomes distorted. The total output of sensor 100, is, as before mentioned, the sum of the output voltages of generators 168 and 136. As generator 136 is disconnected, the contribution of the generator 136 to the total sensor output must be compensated for. To this end bias transformer 185 is energized at the same time generator 136 is de-energized by the adjusted position of switch arm 205 upon energization of relay winding 201. Bias transformer 185 is designed or adjusted to produce a bias voltage equal to the voltage produced by generator 136 at the 5,000 f.p.m. rate of altitude change.

It will be appreciated from the foregoing that rotor 191 of generator 168 in that it is driven by the motor 126 through the low reduction gear train including gearing 134 clutch 146 and low reduction gearing 172 is driven at a faster rate of speed in the rate of altitude change range about 5,000 f.p.m. up to 125,000 f.p.m. The generator 168 therefore generates the variable portion of the sensor output voltage within the rate of altitude change range from 5,000 to 125,000 f.p.m. The rotor 191 of the generator 168 is therefore driven at a rate of speed equivalent to a high rate of altitude change up to a rate of altitude change of 125,000 f.p.m. The rotor 191 of generator 168 is connected through gearing 170 to the E-type transformer 110 and may be driven by the motor 126 at a high rate of speed. The motor 126 thus drives the generator 168 and through gearing 170 the E-transformed to null at a rate of speed sufficient to keep up with fast movements of vane 108 while the bellows 104 is sensing a high rate of altitude change.

The variable command voltage generated by the rate generators 136 and 168 is fed to output from the sensor 100 through lead 181. Lead 182 having mixing resistance 183 interposed therein is connected between output lead 181 and the input to amplifier 122. The sensor command voltage is therefore summed in resistance 183 with respect to the motor control voltage in resistance 120. Rate feed back damping of the motor 126 is therefore provided by the rate generators 136 and 168 which serve to prevent the motor 126 from overshooting.

*Indicator*

An indicator mechanism 220 for operation with the sensor 100 is shown schematically in FIGURE 2. The indicator 220 is adapted to produce a logarithmic indication of the rate of altitude change of the craft in which the indicator is mounted over the entire range of the indicator from zero to 125,000 f.p.m. Indicator 220 is particularly adapted in accordance with this invention for use with the sensor 100 of FIGURE 1 as will more clearly appear.

Indicator 220 comprises an input lead 222 which is connected to sensor output lead C and a control lead 223 which is connected to output sensor lead B. Input lead 222 has a mixing resistor 224 interposed therein and is connected to the input of amplifier 228. Amplifier 228 is connected by output lead 230 to the control winding 232 of a reversible two phase variable speed electric motor 234. The exciting winding 236 of the motor 234 is connected by a conductor 237 to the source 112 of A.C. exciting voltage. The motor rotor 238 is drivingly connected to the rotor 240 of rate generator 242. Rate generator 242 is preferably formed integral with the motor 234 in a manner well known in the art. The generator exciting winding 244 is connected by a conductor 245 to the source 112 of A.C. exciting voltage.

The generator output winding 246 is connected by lead 248 having mixing resistor 250 interposed therein and thereby to lead 222 at point 251 which is at the input of amplifier 228. The rotor 238 of motor 234 is connected by gear train 251 to the variable element or rotor winding 252 of a linear variable transformer 253 which may be of a synchro transformer type. Transformer 253 is provided with an output winding 254 connected to ground at 255 and to an output lead 256. Transformer rotor 252 is connected to ground at 258 and by lead 260 to switch contact 262 of switch 264. Switch 264 is provided with a second switch contact 266 and a contact arm 267 which is connected through conductor 268 to the source 112 of A.C. voltage.

The switch 264 is controlled by a relay winding 269 so arranged that upon de-energization thereof, the contact arm 267 is biased by suitable biasing means so as to maintain closed a switch contact 262 while upon energization of the relay winding 269, the contact arm 267 under the magnetic force of the relay winding 269 opens contact 262 and closes switch contact 266.

The relay winding 269 has one end connected to ground at 270 while the other end of the relay winding 269 is connected to lead 223 which in turn is connected through the sensor output lead B and conductor lead 208 to the source 204 of D.C. voltage when the relay winding 201 of sensor switch 179 is energized so as to cause switch arm 206 to close contact 203.

The output lead 256 of synchro transformer 253 is series connected to the output winding 271 of a bias transformer 272. Transformer 272 has an input winding 273 which is connected to ground at 274 and by lead 275 to switch contact 266 of switch 264. Bias transformer output winding 271 is connected by output lead 276 having mixing resistor 277 interposed therein to indicator input lead 222 at point 278 which is at the input of amplifier 228.

The rotor 252 of synchro transformer 253 is connected by gear train 280 to a logarithmic cam 281. Cam 281 operatively engages a follower 283 which is in turn operatively connected to indicator pointer 284 of visual indicator 285. The follower 283 is operatively engaged by cam 281 during the portion of total rate of altitude change range of the indicator from zero to 5,000 f.p.m. Cam 281 is of logarithmic design to give a more accurate reading over the low rate of altitude change range.

The rotor 238 of motor 234 is further drivingly connected by gear train 286 to the variable element or rotor 287 of variable transformer 288 which may be of a synchro transformer type. The rotor 287 is connected to ground at 289 and by lead 290 to the source 112 of A.C. exciting voltage. Synchro transformer 288 has an output winding 292 which is connected to ground at 293 and by lead 294 having mixing resistor 295 interposed therein to indicator input lead 222 at point 296 which is at the input to amplifier 228.

The rotor 287 of synchro transformer 288 is drivingly connected by gear train 296 to logarithmic cam 297. Cam 297 is operatively engaged with a cam follower 299 during the portion of the total rate of altitude change range of the indicator from 5,000 f.p.m. to 125,000 f.p.m. so as to effect deflection of indicator pointer 284 in proportion to the rate of altitude change.

*Indicator operation*

In considering the operation of the indicator mechanism 220 of FIGURE 2, it may be first assumed that a slow rate of altitude change is being effected within the range of preferably zero to 5,000 f.p.m. Under these conditions, sensor switch 179 is in the position shown in FIGURE 1 and relay winding 269 is therefore de-energized. Indicator contact arm 267 is, therefore, in contact with contact 262 and the variable winding 252 of synchro transformer 253 is connected to the source of A.C. exciting voltage while bias transformer 272 is de-energized. The sensor output command voltage is fed as an indicator input voltage into indicator 220 through input lead 222 and the mixing resistance 224 therein and into amplifier 228 where the command voltage signal is amplified.

The amplified signal is then impressed on the control winding 232 of electric motor 234 to drive the motor in a direction which depends upon the sign of the command voltage. The motor 234 drives a rate generator 242. The voltage generated by generator 242 is proportional to the speed of motor 234 and its voltage output is fed back into the input of amplifier 228 through lead 248 having mixing resistor 250 therein. The ouptut voltage of generator 242 is out of phase with respect to the input voltage from sensor 100 applied through lead 222 and therefore provides error rate dampening of the input voltage to the motor 234.

Electric motor 234 is drivingly connected by gear trains 251 and 286 to the rotors 252 and 287 of synchro transformers 253 and 288, respectively. Upon rotation of the rotor of motor 234, the transformer rotors are rotated in an amount to produce a voltage in the secondaries of the transformer windings proportional to the sensor output voltage.

The output windings of synchro transformers 253 and 288 are connected by lead 256 having a mixing resistor 277 interposed therein and lead 294 having mixing resistor 295 interposed therein to indicator input lead 222 at points 278 and 296, respectively, where the transformer output voltages are summed with respect to the sensor command voltage which is applied to indicator input lead 222 through mixing resistor 224. The output voltages of the synchro transformers 253 and 288 are opposite in polarity to the output voltage of sensor 100. Therefore, if a difference exists between the sensor voltage and the summation of the transformer voltages, the resulting error signal will be operative to vary the direction of rotation of the motor 234 in accordance with the rate of altitude change.

The motor 234 in turn varies the displacement of the transformer rotors 252 and 287 to thereby vary the transformer output voltages to ultimately balance the rate of change of altitude indicated by the sum of the transformer voltages with respect to the rate of change of altitude voltage computed in the sensor 100, at which time the indicator is indicating the sensed rate of altitude change.

The output voltages of transformers 253 and 288 are utilized to balance out or cancel the sensor voltage within the range of rate altitude change from zero to 5,000 f.p.m. Under this condition the motor rotor 238 and all mechanisms become static. The balancing voltage must be a minor image of the output voltage of sensor 100 over the entire dynamic range of the rate of altitude change sensor 100. Therefore, at a rate of change of altitude of 5,000 f.p.m. when the generator 136 of sensor 100 (FIGURE 1) is rendered non-variable by de-energization and a bias voltage of constant magnitude is substituted therefor by energizing bias transformer 185, the synchro transformer 253 is deenergized and bias transformer 272 is energized. This is accomplished by the energization of relay winding 269 to actuate indicator switch 264 so as to cause switch arm 267 to close contact 266 in response to the operation of sensor switch 179. The bias transformer 272 is designed or adjusted so as to have a voltage output which is equal and in-phase with the voltage output of transformer 253 at the 5,000 f.p.m. total indicator output switching level. The constant output of transformer 272 and the variable output of transformer 288 provide a voltage which is the mirror image of the sensor command voltage over the range of rate altitude change from 5,000 f.p.m. to 125,000 f.p.m. The output voltages of transformers 272 and 288 are summed together and with respect to the sensor command voltage to provide error voltage control of the motor 234 for the range of rate of altitude change from 5,000 f.p.m. to 125,000 f.p.m.

The rotor 252 of transformer 253 is connected to cam 281 by gearing 280 and the rotor 287 of transformer 288 is connected by gearing 296 to cam 297. The construction of logarithmic cam 281 is so designed that the follower 283 which is connected to pointer 284 rides on the surface of cam 281 from zero to a predetermined maximum indication of rate of altitude change of 5,000 f.p.m in the illustrated embodiment. Thereafter, when a rate of altitude change of 5,000 f.p.m. is achieved, the gear train 296 is operative to dispose cam 297 in operating relation with the follower 299 of pointer 284. The cam 297 then drives the indicator pointer 284 above a rate of altitude change of 5,000 f.p.m. up to 125,000 f.p.m.

It will be appreciated from the foregoing that the indicator 220 provides an improved, new and novel means in accordance with the invention for indicating rate of altitude change over a large dynamic range.

*Alternative indicator*

An alternative embodiment of the indicator 220 of FIGURE 2 is shown schematically in FIGURE 3 as indicator 300. Indicator 300 is adapted to produce a logarithmic presentation of the rate of altitude change of the craft mounting the indicator for ranges of altitude change in the order of zero to 5,000 f.p.m. and a linear presentation for ranges of altitude to change in the order of 5,000 f.p.m. to 125,000 f.p.m. Indicator 300 is adapted for use with the improved sensor 100 of FIGURE 1 as will more clearly appear.

Indicator 300 has an input lead 302 connected to sensor output lead A and a lead 304 connected to the source 112 of A.C. voltage. Input lead 302 has a mixing resistor 308 interposed therein and is connected to the input of amplifier 310. Amplifier 310 is connected by a lead 312 to a control winding 314 of a reversible two phase variable speed electric motor 316. The exciting winding 318 of motor 316 is connected by conductor 319 to the source 112 of A.C. exciting voltage and its rotor 320 is drivingly connected to the rotor 322 of rate generator 324. The generator exciting winding 326 is connected by a conductor 327 to the source 112 of A.C. exciting voltage and the generator output winding 328 is connected by output lead 330 having mixing resistor 332 interposed therein to lead 302 at point 334 which is at the input of the amplifier 310. The motor 316 is rate stabilized by a generator shunt feed-back through lead 330 to the input of the amplifier 310 in the same manner as the motor 234 of indicator 220.

The rotor 320 of motor 316 is connected by gearing 340 to logarithmic cam 342 which operatively engages follower 345 which is connected to the variable element or rotor 346 of variable transformer 348 which is preferably a linear synchro transformer.

Cam 342 operatively engages follower 345 during the portion of the total range of rate of altitude change of indicator 300 from zero to 5,000 f.p.m. Rotor 346 is connected by gear train 350 to logarithmic linkage 352 which is connected by connection 354 to a low range pointer 356 which is mounted for movement relative to the logarithmic dial 358 of visual indicator 360.

The rotor 346 of transformer 348 is connected to ground at 362 and is connected by lead 364 to lead 304 which is connected to the source 112 of A.C. exciting voltage. Transformer 348 is provided with an output winding 366 which is connected to ground at 368 and by lead 370 having mixing resistance 372 interposed therein to input lead 302 at point 374 which is at the input of amplifier 310.

The rotor 320 of motor 316 is additionally connected by gear train 380 to the variable element or rotor 382 of variable transformer 384 which is preferably a linear synchro transformer. Rotor 382 is connected by gearing 386 to a pointer 388 which is mounted for movement relative to linear dial 390 of visual indicator 392. The rotor 382 is also connected by gearing 394 to a cam 396. Cam 396 is operatively engaged with follower 398 during the portion of the total range of rate of altitude change from 5,000 f.p.m. to 125,000 f.p.m. Cam 396 is operative to maintain transformer rotor 346 deflected to the position it assumed when cam 342 was disengaged from follower 345 when the indicator achieved a total rate of altitude change of 5,000 f.p.m. The rotor 382 of transformer 334 is connected to ground at 402 and by lead 404 to lead 304 which is connected to the source 112 of A.C. exciting voltage. Transformer 384 is provided with an output winding 406 connected to ground at 408 and by output lead 410 having mixing resistance 412 interposed therein to input lead 302 at point 414 which is at the input of amplifier 310.

*Alternative indicator operation*

In considering the operation of the indicator 300, it may be first assumed that a slow rate of altitude change is being effected within the range of preferably zero to 5,000 f.p.m. The sensor output command voltage is fed as an indicator input voltage into indicator 300 through input lead 302 and the mixing resistance 308 therein then into amplifier 310 where the input voltage signal is amplified. The amplified signal is there impressed on the control winding 314 of electric motor 316 which in turn drives a rate generator 324.

The voltage generated by generator 324 is proportional to the speed of motor 316 and its voltage output is fed back into the input of amplifier 310 through lead 330 having mixing resistor 332 therein. The output voltage of generator 324 is out of phase with respect to the command voltage and therefore provides error rate dampening of the input voltage of motor 316.

Electric motor 316 is drivingly connected by gear train 340 to a cam 342 which cam engages follower 345 to deflect transformer rotor 346 an amount proportional to the command signal. Also motor 316 is connected by gear train 380 to transformer rotor 382 to deflect the rotor an amount proportional to the command signal. A voltage is induced in the output winding of each transformer 348 and 384 in an amount proportional to the amount of deflection of their transformer rotors. Transformers 348 and 384 are connected to output by leads 370 having mixing resistance 372 therein and lead 410 having mixing resistance 412 therein to indicator input lead 302 at points 374 and 414, respectively, where the transformer output voltages are summed with respect to the sensor output voltage applied to indicator input lead 302 through mixing resistance 308.

The output voltages of the synchro transformers 348 and 384 are opposite in polarity to the output voltage of sensor 100. Therefore, when a difference exists between the sensor voltage and the summation of the transformer voltages, the resulting error signal will be operative to displace the motor 316 in accordance with the rate of altitude change which in turn varies the displacement of the rotor windings 346 and 382 to thereby vary the transformer output voltages to ultimately balance the rate of change of altitude indicated by the sum of the transformer voltages with respect to the rate of change of altitude voltage computed in the sensor 100. The output voltages of transformers 348 and 384 are utilized to balance or cancel the sensor voltage within the range of altitude change from zero to 5,000 f.p.m. The balancing voltage must be a mirror image of the output command voltage of sensor 100. Therefore, at a total rate of change of altitude of 5,000 f.p.m. when in sensor 100 (FIGURE 1) the generator 136 is de-energized and the bias transformer 185 is energized, the output voltage of indicator transformer 348 is rendered nonvariable. Thereafter, the constant output of transformer 348 and the variable output of transformer 384 are summed together and summed with respect to the sensor output voltage in lead 302 to provide error voltage control of motor 316 for the range of altitude change from 5,000 f.p.m. to 125,000 f.p.m.

As beforementioned, the motor 316 is drivingly connected to the follower 345 of rotor 346 of transformer 348 through gear train 340 and cam 342 and through gear train 380 to the rotor 382 of transformer 384. The cam 342 is operatively engaged with follower 345 to deflect rotor 346 proportionally to the command signal and the rate of altitude change of the craft during the range of altitude change from zero to 5,000 f.p.m. The rotor 346 is connected by gear train 350 and logarithmic linkage 352 to the indicator 356 of the visual indicator 360 to cause the indicator to represent the rate of altitude change being effected up to 5,000 f.p.m.

During this time, the rotor 382 of transformer 384 is also being deflected by the operation of motor 316 thereon through gearing 380 which in turn proportionately deflects pointer 388 of linear indicator 390 and rotates cam 396 a predetermined distance. When a rate of altitude change of 5,000 f.p.m. is achieved, the cam 342 becomes disengaged from the follower 345 of transformer rotor 348 and a cam surface of cam 396 comes in contact with the follower 398. This cam surface of cam 396 is operative to maintain the rotor 346 of transformer 348 deflected to the position it assumed at a rate of change of altitude of 5,000 f.p.m. The rotor 382 of transformer 384 continues to be displaced in proportion to the command signal to deflect indicator pointer 388 of logarithmic indicator 392 during the range of rate of altitude change of 5,000 f.p.m. to 125,000 f.p.m.

It will be seen from the foregoing that the alternative indicator 300 provides an improved, new and novel means in accordance with the invention for indicating rate of altitude change over a large dynamic range.

Although two embodiments of the invention have been illustrated and described in detail, it is to be expressly understood that the invention is not limited thereto. Various changes can be made in the design and arrangement of the parts without departing from the spirit and the scope of the invention as the same will now be understood by those skilled in the art.

What is claimed is:

1. A rate of altitude change indicator system comprising a first variable speed electric motor, a second variable speed electric motor, means sensing an altitude change for controlling the first variable speed electric motor, rate generator means driven by said first motor at a rate which varies directly with a variation in rate of altitude change, means connecting said rate generator means in a rate damping feedback connection to the input of said first motor and to the input of said second variable speed motor to drive said second motor to a position depending upon the rate of altitude change, a synchro transformer means including a rotor means, means connecting said second variable speed motor in driving relation to the rotor means of said synchro transformer means to position said rotor means in accordance with the position of said second motor and to induce in said synchro transformer means a voltage signal which varies directly with the rate of altitude change and which is in-phase opposition with the input voltage to said second motor, means connecting said synchro transformer means to the input of said second motor to provide error control, visual indicator means including a pointer means, and means operably connecting said second motor to the pointer means of said visual indicator means to position said pointer means as a function of the rate of altitude change.

2. A rate of altitude change indicator system comprising a pressure responsive member responsive to changes in atmospheric pressure, a first variable speed motor, a second variable speed motor, electrical signal generating pickoff means responsive to a pressure change sensed by said pressure responsive member to vary the speed of said first motor as a function of the sensed pressure change, a pair of rate generators operably connected to said first motor and each having an output, the two outputs being series connected to an output lead, said output lead being connected to the second variable speed motor to provide said second motor with a rate of altitude change command signal, a pair of transformer means each having an output winding and a variable element, means operably connecting said second motor to said variable elements so as to displace said elements relative to their output windings as a function of the position of said second motor to induce a voltage signal in said output windings in-phase opposition to said command signal, means connecting said output windings to the input of said second motor to provide error signal motor control, transfer means operable by the output of one of said rate generators upon the attainment of a predetermined rate of altitude change for deenergizing the other of said rate generators, first means operable by said transfer means for substituting a bias voltage of predetermined magnitude for the output of said other rate generator, second means operable by said transfer means for connecting the first motor to said pickoff to drive said pickoff to null, and means operably connecting the second motor to an indicating pointer means to indicate the rate of altitude change.

3. A rate of altitude change indicator system comprising a pressure responsive member responsive to changes in atmospheric pressure, a first reversible variable speed motor, a second reversible variable speed motor, electrical signal generating pickoff means responsive to a pressure change sensed by said pressure responsive member to vary the speed of said first motor as a function of the sensed pressure change, a pair of rate generators driven by said first motor and each having an output the two outputs being series connected to an output lead, said output lead being connected to the input of said first variable speed motor to provide rate feedback damping therefor and to the input of said second variable speed motor to provide said second motor with a rate of altitude change command voltage, a pair of synchro transformers each having an output winding and a rotor, said rotors being operably connected to said second motor to be displaced relative to said output windings as a function of the position of said second motor to induce a voltage signal in said output windings which is a mirror image of said command voltage, means connecting said output windings to the input of said second motor to provide error signal control for said second motor, means operable upon the attainment of a predetermined rate of altitude change for deenergizing one of said rate generators and substituting a bias voltage of predetermined magnitude, and means operably upon the attainment of said predetermined rate of altitude change for deenergizing one of said synchro transformers and substituting a bias voltage of predetermined magnitude, means for connecting the first motor to said pickoff to drive said pickoff to null, indicating pointer means, and means operable connecting said second motor and said synchro transformers to said indicating pointer means to position said pointer means in accordance with the predetermined rate of altitude change.

4. A rate of altitude change sensor indicator system comprising a pressure responsive member responsive to changes in atmospheric pressure, a first variable speed motor, electrical signal generating pickoff means responsive to said pressure responsive member for varying the rate of speed of said first motor in accordance with the rate of change in altitude, first and second rate generator means, each of said rate generator means having an output, the two outputs from said first and second generator means being series connected in a sensor output lead, said first and second generator means being drivingly connected to said first motor to be driven thereby at a rate of speed which varies directly with the rate of speed of said first motor to provide a total sensor output command voltage through the sensor output lead which is the sum of the voltages generated by said first and second generators, a constant bias voltage generating means series connected in said output lead, means connecting said sensor output lead to the input of said first motor to provide error rate damping for said first motor, a high reduction gear train connecting said first motor to said second generator over a range of low rate of altitude change, a low reduction gear train connecting said first motor to said second generator over a range of high rate of altitude change, sensor switching means, means responsive to a predetermined rate of altitude change output signal from said second generator for controlling said sensor switching means, said switching means including clutch means for switching from said high reduction gear train to said low reduction gear train and means for electrically disconnecting the first generator and energizing said bias voltage means, means operatively connecting said first motor to said electrical signal generating pickoff means to drive said pickoff means to null, a second reversible variable speed motor connected to said sensor output lead responsive to said command voltage, rate generator means responsive to said second motor connected in shunt feedback connection to the input of said second motor to provide error rate damping for the second motor, first and second variable output transformer means each having a variable element mechanically connected to said second motor adapted to be deflected at least over a low range of rate of altitude change proportionally to the position of said second motor and the rate of altitude change to generate a rate of altitude change voltage signal in-phase opposition to said command voltage, means summing the output voltages of said transformers together with respect to said command voltage to provide error signal control for said second motor, visual indicator means, means operably connecting the variable elements of said transformers to said indicator means, and indicator switching means responsive to said sensor switching means operative upon the attainment of said predetermined rate of altitude change including means for de-energizing said first transformer, and means substituting therefor a bias voltage of predetermined constant magnitude.

5. A rate of altitude change sensor comprising a pressure responsive member responsive to changes in atmospheric pressure, a variable speed motor, electrical signal generating pickoff means responsive to said pressure responsive member for varying the rate of speed of said motor in accordance with the rate of change in altitude, first and second rate generator means, each of said rate generator means having an output, the two outputs from said first and second rate generator means being series connected in a sensor output lead, said first and second rate generator means being drivingly connected to said motor to be driven thereby at a rate of speed which varies directly with the rate of speed of said motor to provide a total sensor output command voltage through said sensor output lead which is the sum of the voltages generated by said first and second rate generator means, a constant bias voltage generating means connected to said output lead, means connecting said sensor output lead to the input of said motor to provide error rate damping for said motor, a high reduction gear train connecting said motor to said second rate generator means over a range of low rate of altitude change, a low reduction gear train connecting said motor to said second rate generator means over a range of high rate of altitude change, switching means including clutch means operable for switching from said high reduction gear train to said low reduction gear train and relay means operable for electrically disconnecting said first generator means and concomitantly energizing said bias voltage means, means responsive to a predetermined rate of altitude change output signal from said second rate generator means for actuating said switching means so as to effect the concomitant operation of said clutch and relay means, and means connecting said motor to said electrical signal generating pickoff means to drive said pickoff means to null.

6. The rate of altitude change sensor of claim 5 wherein said clutch means includes a first magnetically operated clutch portion having normally engaged clutch elements connected to said motor and said high reduction gear train, a second magnetically operated clutch portion having normally disengaged clutch elements connected to said motor and to said low reduction gear train, and a normally de-energized magnetic clutch operator disposed in operative relation to said clutch portions adapted upon energization to disengage the clutch elements of said first clutch portion and engage the clutch elements of said second clutch portion.

7. A rate of altitude change indicator comprising means generating a control signal proportional to a sensed rate of altitude change, a variable speed motor responsive to said control signal, rate generator means responsive to said motor and connected in a shunt feedback connection to the input of said motor to provide error rate damping for the motor, first and second variable output transformer means each having a variable element mechanically connected to said motor adapted to be deflected proportionally to the position of said motor and the rate of altitude change to generate a rate of altitude change voltage signal in-phase opposition to said control signal, means summing the output voltages of said transformers together with respect to said control signal to provide error signal control for said motor, visual indicator means, means operably connecting the variable elements of said transformers to said indicator means such that deflection of the variable element of said first transformer means effects operation of said indicator means up to a predetermined rate of altitude change and thereafter the variable element of said second transformer means effects operation of said indicator means, and switching means operative upon the attainment of said predetermined rate of altitude change including means for rendering said first transformer means ineffective, and means substituting therefor a bias voltage of predetermined constant magnitude.

8. The indicator of claim 7 wherein the means included in said switching means for rendering said first transformer ineffective comprises means for deenergizing said first transformer and the means included in said switching means for substituting a bias voltage of constant magnitude therfore comprises a bias transformer operatively interposed in the output lead of said first transformer.

9. The indicator of claim 7 wherein the means for connecting the variable elements of said first and second transformers to said indicator means comprises first and second cam means connected to the variable elements of said first and second transformers, respectively, a first follower operatively connected to said indicator means, said first cam means having a cam surface in operative engagement with said first follower up to a predetermined rate of altitude change to drive said indicator means over a range of low rate of altitude change, a second follower operatively connected to said indicator means, and said second cam means having a cam surface which comes into operative engagement with said second follower upon the attainment of said predetermined rate of altitude change to drive said indicator means over a range of high rate of altitude change.

10. In a rate of altitude change sensor a first rate generator operable over a range of low rate of altitude change, a second rate generator operable over a range of high rate of altitude change, said first and second rate generators being series connected to provide a total rate of altitude change voltage signal through a common output lead, bias voltage means operably connected to said output lead, switching means, voltage discriminator means connected to the output voltage of said second rate generator and to the switching means, said switching means being operably connected to said first generator and to said bias voltage means to alternately effect energization thereof, said discriminator means in response to a predetermined voltage output from said second rate generator indicative of a predetermined rate of altitude change being thereupon operative to activate said switching means which upon activation de-energizes said first rate generator and effects energization of said bias voltage means connected to said output lead, said bias voltage means thereupon effecting a voltage equal in magnitude to the magnitude of the output voltage of said first rate generator at the time of the activation of the switching means.

11. A rate of altitude change sensor comprising in combination first signal generator means operable over a range of low rate of altitude change, a second signal generator means operable over a range of high rate of altitude change, said first and second signal generator means being serially connected so as to provide a total rate of altitude change signal, and switching means operable by said second signal generator means in response to a predetermined rate of altitude change to deactivate said first signal generator means, and other signal generator means being serially connected to said first and second signal generator means and rendered effective by said switching means upon the deactivation of said first signal generator means so as to provide a signal equal in magnitude to the magnitude of the signal of said first signal generator means at the time the deactivation of the first signal generator means is effected by said switching means.

12. A rate of altitude change indicator comprising means generating a control signal proportional to a sensed rate of altitude change, variable speed motor means responsive to said control signal, rate generator means driven by said motor means to provide a damping signal to the motor means, first and second signal generator means each having a variable control means operably connected to said motor means and adapted to be deflected proportional to the position of said motor means and the rate of altitude change so as to generate through said first and second signal generator means a rate of altitude change signal, means for summing the signals of said first and second signal generator means together with said control signal to provide a signal to control said motor means, means operably connecting the variable control means of said first and second signal generating means to said indicator means so that the deflection of the variable control means of said first signal generating means effects operation of said indicator means up to a predetermined rate of altitude change and thereafter the deflection of the variable control means of said second signal generating means effects operation of said indicator means, and switching means responsive to the rate of altitude change control signal and operative upon obtainment of said predetermined rate of altitude change, said switching means operative including means thereupon for terminating the output of said first signal generating means, and other means thereupon operative for substituting for the signal of the first signal generating means a signal of predetermined constant magnitude.

13. A rate of altitude change indicator comprising means generating a control signal proportional to a sensed rate of altitude change, a variable speed motor responsive to said control signal, rate generator means responsive to said motor and connected in a shunt feedback connection to the input of said motor to provide error rate damping for the motor, first and second variable output transformer means each having a variable element mechanically connected to said motor adapted to be deflected proportionally to the position of said motor and the rate of altitude change to generate a rate of altitude change voltage signal in-phase opposition to said control signal, means summing the output voltages of said transformers together with respect to said control signal to provide error signal control for said motor, visual indicator means, first means operably connecting the variable element of said first transformer means to a first indicator element of said visual indicator means so that deflection of the variable element of said first transformer means causes operation of said first indicator element, second means operably connecting the variable element of said second transformer means to a second indicator element of said visual indicator means so that deflection of the variable element of said second transformer means causes operation of said second indicator element, a first follower drivingly connected to the variable element of said first transformer, a first cam operatively positioned by said variable speed motor and having a cam surface in operative engagement with said first follower which becomes disengaged from said first follower at a predetermined adjusted position of the motor and upon attainment of a predetermined rate of altitude change, a second cam operatively positioned by the deflection of the variable element of said second transformer, a second follower drivingly connected to the variable element of said first transformer, said second cam having a cam surface which comes into engagement with said second follower at said predetermined adjusted position of the motor and upon attainment of said predetermined rate of altitude change so as to maintain said variable element of said first transformer in the deflected position assumed thereby upon the attainment of said predetermined rate of altitude change.

14. A rate of altitude change indicator comprising means generating a control signal proportional to a sensed rate of altitude change, a variable speed motor responsive to said control signal, rate generator means responsive to said motor and connected in a shunt feedback connection to the input of said motor to provide error rate damping for the motor, first and second variable output transformer means each having a variable element mechanically connected to said motor adapted to be deflected proportionally to the position of said motor and the rate of altitude change to generate a rate of altitude change voltage signal in-phase opposition to said control signal, means summing the output voltages of said transformers together with respect to said control signal to provide error signal control for said motor, visual indicator means, a first gear train driven by said motor and having a logarithmic cam connected to the variable element of said first transformer and to a first indicator pointer of said indicator means to drive said first indicator pointer over a range of low rate of altitude change, a second gear train driven by said motor and drivingly connecting the motor to the variable element of said second transformer and a second indicator pointer of said indicator means, a linear linkage drivingly connecting the variable element of said second transformer to the variable element of said first transformer and effective to maintain the variable element of said first transformer at a predetermined deflected position corresponding to the upper limit of the range of low rate of altitude change effected by said logarithmic cam, and the variable element of said second transformer and second indicator pointer being deflected by said motor through said second gear train over a range in excess of said range of low rate of altitude change.

References Cited by the Examiner

UNITED STATES PATENTS

| | | | |
|---|---|---|---|
| 2,648,041 | 8/53 | Perkins | 73—179 |
| 2,698,407 | 12/54 | Pease | 318—20.270 |
| 2,726,544 | 12/55 | Anastasia | 73—179 |
| 2,830,243 | 4/58 | Walcott | 73—181 X |
| 2,934,267 | 4/60 | Wirkler | 73—178 |
| 2,985,012 | 5/61 | Wail | 73—178 X |
| 3,023,616 | 3/62 | Miller | 73—178 |
| 3,028,534 | 4/62 | Chilton | 73—179 X |

ISAAC LISANN, *Primary Examiner.*

LEONARD FORMAN, *Examiner.*

UNITED STATES PATENT OFFICE
CERTIFICATE OF CORRECTION

Patent No. 3,206,975　　　　　　　　　　　September 21, 1965

Henry G. Elwell, Jr., et al.

It is hereby certified that error appears in the above numbered patent requiring correction and that the said Letters Patent should read as corrected below.

Column 12, line 49, after "output" insert a comma; column 15, line 75 and column 16, line 1, strike out "operative including means thereupon" and insert instead -- including means thereupon operative --.

Signed and sealed this 19th day of April 1966.

(SEAL)
Attest:

ERNEST W. SWIDER
Attesting Officer

EDWARD J. BRENNER
Commissioner of Patents